United States Patent [19]
Gibbs

[11] 4,455,967
[45] Jun. 26, 1984

[54] ANIMAL FEEDING APPARATUS

[76] Inventor: Lee H. Gibbs, Box 21, Fallon, Mont. 59326

[21] Appl. No.: 437,031

[22] Filed: Oct. 26, 1982

[51] Int. Cl.³ ............................................. A01K 5/00
[52] U.S. Cl. ................................... 119/58; 119/52 R
[58] Field of Search ................ 119/58, 52 R, 53, 53.5, 119/60, 61; 414/24.5, 459; 298/8 H, 35 R, 35 M, 37, 27

[56] References Cited

U.S. PATENT DOCUMENTS

| | | | |
|---|---|---|---|
| 1,347,070 | 7/1920 | York | 119/58 |
| 2,290,042 | 7/1942 | Granville | 119/52 R |
| 2,936,735 | 5/1960 | Smith | 119/52 R |
| 3,999,520 | 12/1976 | Ferterl | 119/58 |
| 4,072,241 | 2/1978 | Parker et al. | 414/24.5 |
| 4,227,844 | 10/1980 | Love | 414/24.5 |

FOREIGN PATENT DOCUMENTS 162380 2/1954 Australia .......................... 119/58

*Primary Examiner*—Gene Mancene
*Assistant Examiner*—Kris R. Schulze
*Attorney, Agent, or Firm*—Arthur L. Urban

[57] ABSTRACT

Animal feeding apparatus including a base portion, a support portion, a divider portion and a trough portion; the base portion including a pair of spaced substantially horizontal longitudinal sections, the longitudinal sections being disposed substantially parallel to each other, each of the longitudinal sections having a height significantly greater than the thickness thereof; the support portion including a plurality of spaced transverse members, each of the transverse members extending between the longitudinal sections along the length thereof, an undercarriage disposed adjacent one end of the base portion, the undercarriage including a transverse axle and wheels disposed adjacent the ends of the axle, a hitch disposed adjacent the end of the base portion remote from the undercarriage; the divider portion including an elevated longitudinal center section, the center section being supported on and affixed to the transverse members, the center section being disposed in a generally horizontal orientation intermediate the longitudinal sections, the center section having a height significantly greater than the thickness thereof, the upper edge of the center section being located significantly above the upper edges of the longitudinal sections; the trough portion including a pair of longitudinal movable sections, each of the movable sections having one longitudinal edge pivotally connected to the lower edge of one of the longitudinal sections, each of the movable sections being pivotable from a position in which it is substantially horizontal to a position in which the free longitudinal edge of the movable section is substantially lower than the pivotally connected longitudinal edge thereof.

11 Claims, 4 Drawing Figures

ANIMAL FEEDING APPARATUS

This invention relates to a novel feeding apparatus and more particularly relates to an apparatus for feeding animals.

Animals have been fed by man throughout history. The manner of feeding generally depended upon the particular animals and the type of food being fed. Originally, dry feed such as forage simply was placed on the ground. While this method was satisfactory if the feed could be placed on clean dry ground, continually feeding at the same spot on the ground could result in considerable contamination of the feed and waste. The animals would scatter the food as they ate it. Also, they might trample some of it underfoot. If the ground is wet or moist, the feed could be mixed with the dirt or mud and become inedible.

More recently, with domestic animals such as cattle, horses, sheep and the like that may be kept inside a barn or may be confined in a pasture or corral, the feed generally is placed into a trough or bin. With pets that are kept inside or near a dwelling, the food ordinarily is placed into a container such as a bowl or dish.

Although feeding animals from a container such as bowl, trough, etc. solves some of the problems encountered with placing feed on the ground, some problems still remain. Food may drop from the animals' mouths as they eat. If the animals should turn their heads away from the feeding container, the feed still will fall to the ground. The feed thus will again be contaminated by the dirt.

Contamination and wasting of feed are not the only problems. Since domestic animals are not housebroken, they will relieve themselves close to the feed bins or containers and the manure will be mixed with the feed on the ground. The animals may be attracted to the contaminated feed and eat it. By eating the contaminated food, they may pick up bacteria, virus, parasites, etc. and become ill.

The sick animals must be cared for which takes extra time and attention by those attending the animals as well as considerable expense. Also, the weight gain and the resulting value of the animal will be adversely affected.

From the above, it is clear that present and past methods for feeding animals and especially domestic animals are not without their shortcomings. Thus, there is a need for new methods and equipment for feeding domestic animals.

The present invention provides a novel apparatus for feeding animals and particularly domestic animals. The animal feeding apparatus of the invention minimizes contamination of the feed and thereby reduces the incidence of sickness of the animals. The apparatus simplifies the feeding of animals in open areas. The feeding apparatus allows animals to be fed quickly and conveniently.

The animal feeding apparatus of the present invention is simple in design and is relatively inexpensive. The apparatus can be manufactured from commercially available materials and components. Conventional farm equipment fabrication techniques and procedures and semi-skilled labor can be employed in its construction.

The feeding apparatus of the invention can be used by farm and ranch hands after only a minimum of instruction. The apparatus can be moved from one location to another easily and quickly. The animal feeding apparatus is durable in construction and has a long useful life. Little maintenance is required to keep the apparatus in operating condition.

These and other benefits and advantages of the novel animal feeding apparatus of the present invention will be apparent from the following decription and the accompanying drawings in which.

Figure 1:
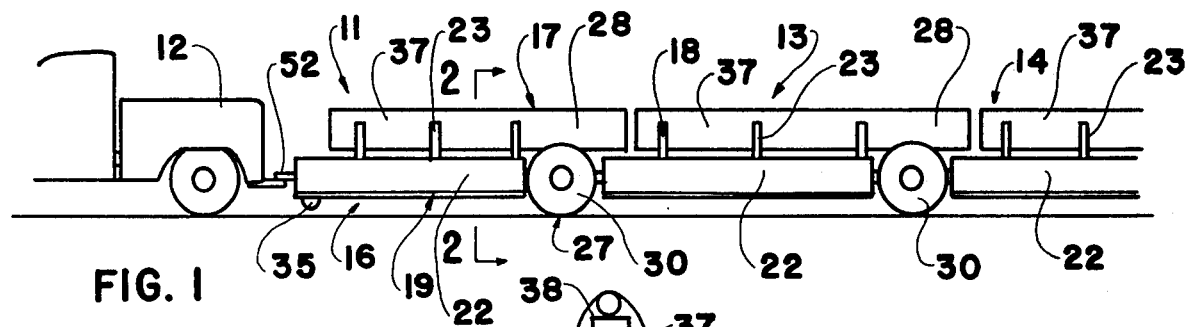
FIG. 1 is a side elevation of one form of the animal feeding apparatus of the invention.

As shown in the drawings, one form of the novel animal feeding apparatus 11 of the present invention is being towed by a vehicle 12 along with similar feeding units 13 and 14. The feeding apparatus 11 includes a base portion 16, a support portion 17, a divider portion 18 anbd a trough portion 19.

The base portion 16 of the feeding apparatus 11 includes a pair of substantially horizontal longitudinal sections 21 and 22. The longitudinal sections 21 and 22 are disposed substantially parallel to and spaced from each other. Each of the longitudinal sections has a height significantly greater than the thickness thereof.

The support portion 17 of the animal feeding apparatus 11 of the invention includes a plurality of spaced transverse members 23. Each of the transverse members 23 extends between the longitudinal sections 21 and 22 along the length thereof. Advantageously, transverse members 23 are metal frame members including a horizontal section 24 with an upstanding section 25 extending upwardly therefrom.

The support portion 17 also includes undercarriage means 27. The undercarriage 27 is disposed adjacent one end 28 of the base portion 16. The undercarriage includes a transverse axle 29 and wheels 30 disposed adjacent the ends of the axle. The undercarriage 27 preferably is disposed adjacent to one of the transverse members 23 and affixed thereto.

Hitch means 32 are disposed adjacent the end 33 of the base portion 16 remote from the undercarriage 27. Connector means 34 advantageously are disposed adjacent to the undercarriage 27. Thus, the hitch 32 of one feeding unit 13 is engageable with the connector 34 of another feeding unit 11. Preferably, the base portion 16 further includes skid means 35 adjacent the hitch 32 and the end 33 remote from the undercarriage 27.

The divider portion 18 of the feeding apparatus 11 includes an elevated longitudinal center section 37. The center section 37 is supported on and affixed to the transverse members 23. The center section 37 is disposed in a generally horizontal orientation intermediate the longitudinal sections 21 and 22. The center section 37 has a height significantly greater than the thickness thereof.

The upper edge 38 of the center section 37 is located a significant distance above the upper edges 39 and 40 of the longitudinal sections 21 and 22 respectively. The lower edge of center section 37 advantageously is spaced slightly above a plane of the upper edges 39 and 40 of the longitudinal sections 21 and 22.

Figure 2:
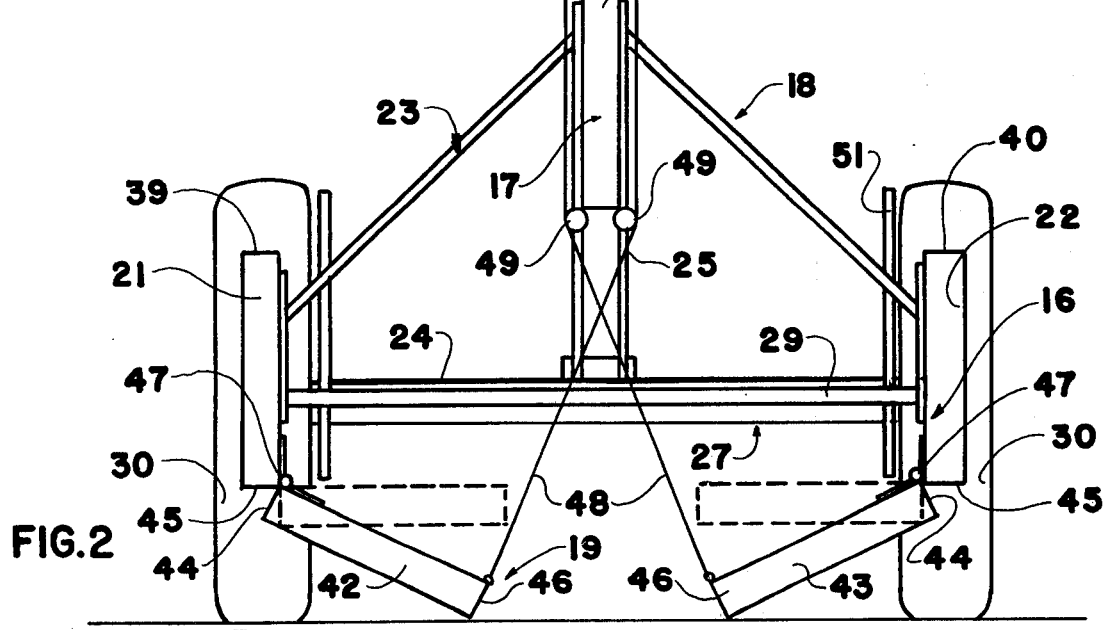
FIG. 2 is a sectional view taken along line 2—2 of FIG. 1.

The trough portion 19 of the feeding apparatus 11 includes a pair of longitudinal movable sections 42 and 43. Each of the movable sections has a longitudinal edge 44 pivotally connected to the lower edges 45 of one of the longitudinal sections 21 and 22. Each of the movable sections 42 and 43 is pivotable from a position in which it is substantially horizontal (shown in dotted outline in FIG. 2) to a position in which the free longitudinal edge 46 of the movable sections 42 and 43 is substantially lower than the pivotally connected edge 44 thereof (shown in solid outline in FIG. 2).

The free edges 46 of the movable sections 42 and 43 advantageously are disposed closely adjacent to one another when the sections are in a lowered position. Preferably, the pivotal connection of the longitudinal sections 21 and 22 with the movable sections 42 and 43 is through hinged means 47.

The trough portion 19 also includes means for changing the position of the movable sections 42 and 43. Advantageously, the changing means may include a flexible elongated member such as a cable 48, rope or the like which may be employed with a suitable pulley 49 or pulleys if desired.

Figure 3:
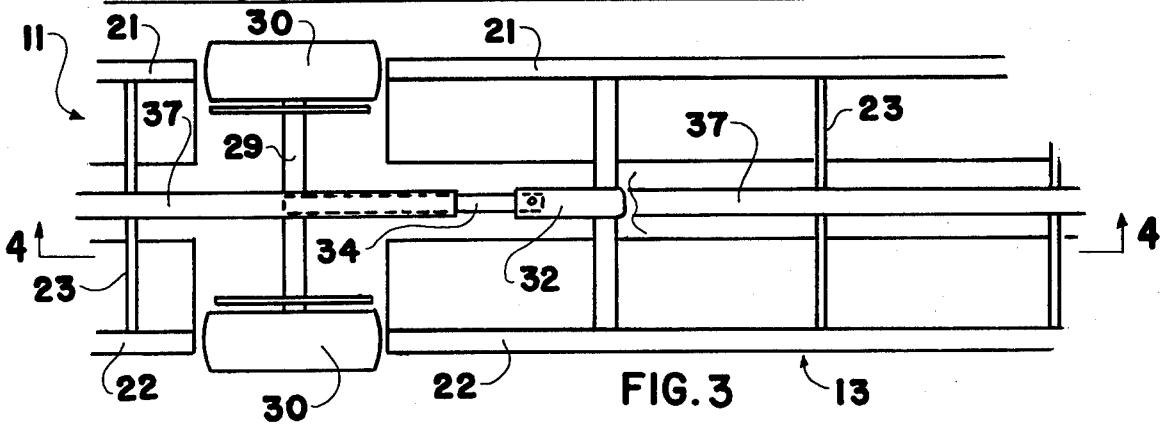
FIG. 3 is a fragmentary top view of the feeding apparatus shown in FIGS. 1 and 2.
Figure 4:
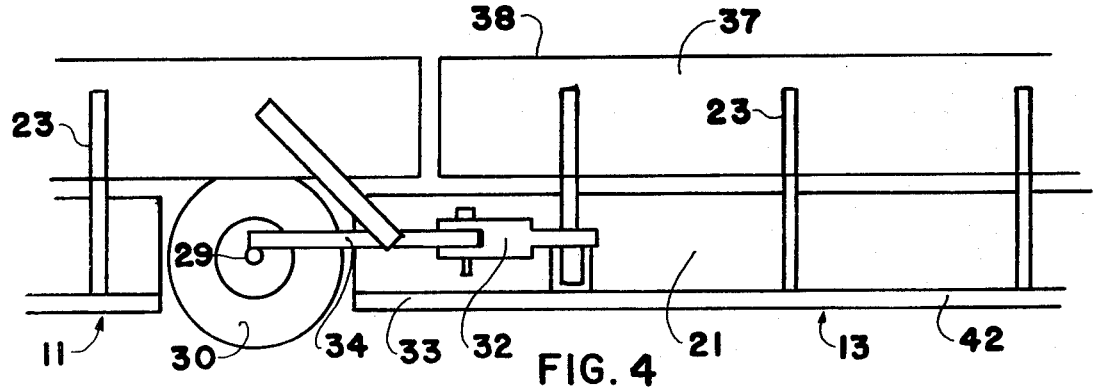
FIG. 4 is a sectional view taken along line 4—4 of FIG. 3.

The longitudinal, center and movable sections 21–22, 37 and 42–43 respectively have elongated board-shaped configurations such as wooden boards. It is preferred that the longitudinal sections 21 and 22 be generally aligned with the wheels 30 as shown in FIG. 3.

Advantageously, shield sections 51 are disposed along the inside surfaces of the wheels 30. This construction provides substantially continuous side surfaces for the feed bins formed between the longitudinal sections 21 and 22.

The animal feeding apparatus 11 of the present invention is assembled by fastening the longitudinal sections 21 and 22 to opposite ends of the transverse members 23 which have been positioned along the length thereof. The center section 37 is mounted along the centers of the transverse members 23. The undercarriage 27 with connector 34 is secured adjacent one end 28 of the base portion 16. A hitch 32 is secured to the opposite end 33 of the base portion.

Movable sections 42 and 43 are pivotally connected to the lower edges 45 of the longitudinal sections 21 and 33 through hinges 47. Also, the cable 48 or other position changing means are secured to the movable sections. The feeding apparatus 11 now is ready for use.

The feeding apparatus 11 of the present invention is connected to a towing vehicle 12 through a suitable trailer hitch 52. If desired, additional feeding units 13 and 14 similar to apparatus 11 can be connected behind through hitches 32 and connectors 34. Before moving the feed unit train, apparatus 11 and units 13 and 14 are checked to be sure that the movable sections 42 and 43 are in a raised position clear of the ground. Then the train is towed to the feeding site.

When the feeding site is reached, the apparatus 11 and units 13 and 14 are prepared for use. The movable sections 42 and 43 of each unit are lowered until the free edges 46 thereof are closely adjacent and/or in contact with the ground. This positioning of the movable sections 42 and 43 creates parallel feeding troughs with a common area on the ground. The feed, whether loose forage or pellets, then is placed in the apparatus. As the feed is consumed, it is replenished as needed.

After a period of time, the ground around the apparatus will become contaminated with manure, spilled feed, mud, etc. When this occurs, the apparatus can be moved to a new feeding site.

This can be accomplished easily by raising the movable sections 42 and 43 clear of the ground using cables 48. The apparatus now is ready to be towed with vehicle 12 to a new feeding site. The site can be clean ground only a few yards from the previous site or can be in an entirely different area.

In either case, the apparatus 11 is prepared for use again simply by lowering the movable sections 42 and 43 into a feeding position and adding feed to the apparatus. The moving operation can be repeated at desired intervals quickly and efficiently.

The above description and the accompanying drawings show that the present invention provides a novel animal feeding apparatus with advantages not found in previous feeders. The feeding apparatus of the invention provides a simple means for feeding domestic animals. The apparatus helps minimize contamination of feed eaten by the animals. This reduces the incidence of sickness of the animals.

The feeding apparatus of the invention is simple in design and relatively inexpensive. The apparatus can be manufactured employing conventional farm equipment fabrication methods using semi-skilled labor and commercially available materials and components. The feeding apparatus also is durable in construction and has a long useful life with little maintenance.

The feeding apparatus can be used efficiently after only a minimum of instruction by farm and ranch hands. The apparatus is simple to set up and/or to prepare for moving. The design of the apparatus makes it difficult for animals to accidentally step into the feeding troughs.

It will be apparent that various modifications can be made in the particular animal feeding apparatus described in detail and shown in the drawings within the scope of the invention. The size, configuration and arrangement of components can be different to meet specific requirements. Also, the apparatus can be constructed from a variety of materials including wood, metals, plastics and combinations thereof. Therefore, the scope of the invention is to be limited only by the following claims.

What is claimed is:

1. Animal feeding apparatus including a base portion, a support portion, a divider portion and a trough portion; said base portion including a pair of spaced substantially horizontal longitudinal sections, said longitudinal sections being disposed substantially parallel to each other, each of said longitudinal sections having a height significantly greater than the thickness thereof; said support portion including a plurality of spaced transverse members, each of said transverse members attached to and extending between said longitudinal sections along the length thereof, said transverse members being frame members including a horizontal section extending between said longitudinal sections with an upstanding section extending upwardly from said horizontal section, undercarriage means disposed adjacent to one of said transverse members and affixed thereto said undercarriage means including a tranasverse axle and wheels disposed adjacent the ends of said axle, hitch means disposed adjacent the end of said base portion remote from said undercarriage means; said divider portion including an elevated longitudinal center section, said center section being supported on and affixed to said upstanding sections of said transverse members, said center section being disposed in a generally horizontal orientation intermediate said longitudinal sections, said center section having a height significantly greater than the thickness thereof; an upper edge of said center section being located significantly above upper edges of said longitudinal sections; said trough portion including a pair of longitudinal movable sections, each of said movable sections having one longitudinal edge pivotally connected to the lower edge of one of said longitudinal sections, each of said movable sections being pivotable from a position in which it is substantially horizontal to a lowered position in which the free longitudinal edge of said movable sections are adapted to engage the g round, means for changing the position of said movable sections to said horizontal position and to said lowered ground engaging position; whereby said apparatus is towed to a feeding site with said movable sections in a raised position, said movable sections then are lowered so the free longitudinal edges engage the ground, thereby forming said trough by said longitudinal sections, said movable sections in the lowered position, and the ground between said movable sections so that when feed is placed between said longitudinal sections and after the feed has been consumed, said movable sections are raised again, said apparatus is towed to a new feeding site and said movable sections are lowered again to a feeding position.

2. Animal feeding apparatus according to claim 1 wherein said free edges of said movable sections are disposed closely adjacent to one another when said sections are in a lowered position.

3. Animal feeding apparatus according to claim 1 including hinge means connecting said movable sections with said longitudinal sections.

4. Animal feeding apparatus according to claim 1 wherein said longitudinal sections are generally aligned with said wheels of said undercarrage means.

5. Animal feeding apparatus according to claim 4 wherein shield sections are disposed along the inside surfaces of said wheels.

6. Animal feeding apparatus according to claim 1 including connector means for connecting a plurality of feeding apparatuses together disposed adjacent to said undercarriage means.

7. Animal feeding apparatus according to claim 1 wherein the lower edge of said center section is spaced slightly above a plane of said upper edges of said longitudinal sections.

8. Animal feeding apparatus according to claim 1 wherein said longitudinal, center and movable sections have elongated board-shaped configurations.

9. Animal feeding apparatus according to claim 1 wherein said longitudinal, center and movable sections are wooden boards.

10. Animal feeding apparatus according to claim 1 wherein said base portion includes skid means adjacent the end thereof remote from said undercarriage means.

11. Animal feeding apparatus according to claim 1 including hinge means connecting said movable sections with said longitudinal sections, and said movable sections are capable of contacting the ground.

* * * * *